United States Patent
Hung et al.

(10) Patent No.: US 8,422,664 B2
(45) Date of Patent: Apr. 16, 2013

(54) INTEGRATED ACCESS DEVICE AND OVERCURRENT PROTECTION METHOD

(75) Inventors: Kuo-Wei Hung, Taipei Hsien (TW); Jie Li, Shanghai (CN)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 720 days.

(21) Appl. No.: 12/701,678

(22) Filed: Feb. 8, 2010

(65) Prior Publication Data
US 2010/0316214 A1  Dec. 16, 2010

(30) Foreign Application Priority Data
Jun. 10, 2009  (CN) .......................... 2009 1 0303134

(51) Int. Cl.
*H04M 1/00*  (2006.01)
(52) U.S. Cl.
USPC ........................................................ 379/412

(58) Field of Classification Search ................. 379/412
See application file for complete search history.

(56) References Cited

U.S. PATENT DOCUMENTS

| 6,748,515 | B1* | 6/2004 | Hendrickson et al. .......... 712/32 |
| 7,293,710 | B2 | 11/2007 | Chang et al. |
| 7,881,457 | B1* | 2/2011 | Chen et al. ............... 379/399.01 |
| 2002/0090080 | A1* | 7/2002 | Tiernan ........................ 379/412 |

* cited by examiner

Primary Examiner — Simon Sing
(74) Attorney, Agent, or Firm — Altis Law Group, Inc.

(57) ABSTRACT

An integrated access device (IAD) protects overcurrent of a DAA chipset. The IAD periodically detects an on-hook/off-hook state of the DAA chipset, and periodically monitors an OPD state of the DAA chipset upon the condition that the on-hook/off-hook state of the DAA chipset is detected in off-hook state at least twice. The IAD further sets the on-hook/off-hook state of the DAA chipset as on-hook to avoid damage to the DAA chipset caused by overcurrent upon the condition that the OPD state of the DAA chipset indicates the DAA chipset is overcurrent.

7 Claims, 2 Drawing Sheets

INTEGRATED ACCESS DEVICE AND OVERCURRENT PROTECTION METHOD

BACKGROUND

1. Technical Field

Embodiments of the present disclosure relate to access devices, and more particularly, to an integrated access device and overcurrent protection method thereof.

2. Description of Related Art

An Integrated Access Device (IAD) is customer premises equipment that provides access to wide area networks and the Internet. Specifically, IADs aggregate multiple channels of information, including voice and data, across a single shared access link to a carrier or service provider PoP (point-of-presence).

However, access link overcurrent often damage data access arrangement (DAA) chipsets during IAD communication with the public switched telephone network (PSTN). Overcurrent is a situation where a larger than intended electric current exists through a conductor, leading to excessive heat generation, fire hazard, and equipment damage. Commonly used overcurrent protection mechanisms of IAD with hardware circuits tend to be prohibitively expensive. As such, a need exists for an IAD capable of overcoming the foregoing limitations.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
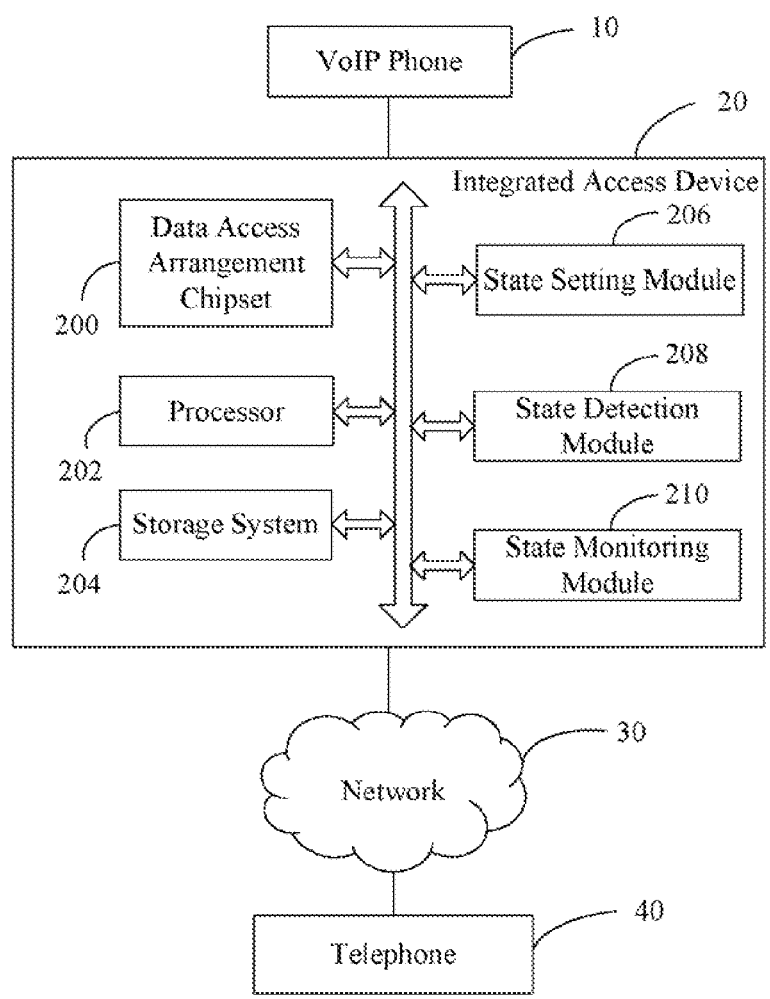
FIG. 1 is a schematic diagram of an application environment and functional modules of one embodiment of an Integrated Access Device (IAD) of the present disclosure.

FIG. 1 is a schematic diagram of an application environment and functional modules of one embodiment of an integrated access device (IAD) 20 of the present disclosure. A VoIP phone 10 communicates with a telephone 40 by accessing a network 30 using the IAD 20. The IAD 20 may be a digital subscriber line (xDSL) modem. The telephone 40 may be a PSTN telephone or a VoIP telephone, for example.

In one embodiment, the IAD 20 includes a data access arrangement (DAA) chipset 200, a processor 202, a storage system 204, a state setting module 206, a state detection module 208, and a state monitoring module 210. The modules 206-210 may include one or more computerized instructions stored in the storage system 204 and executed by the at least one processor 202. The storage system 204 may comprise one or more random access memories (RAM), such as a static RAM (SRAM), a dynamic RAM (DRAM), or an electrically erasable programmable read-only memory (EEPROM).

The DAA chipset 200 may stay in different states, such as an on-hook/off-hook state, an overload detection state, and an overload protect detected (OPD) state. The on-hook/off-hook state may be respectively represented by logic 1 or 0 to indicate whether the IAD has converted a VoIP call to a PSTN call. For example, if the IAD has converted a VoIP call to a PSTN call, the on-hook/off-hook state is logic 1. If the IAD has not converted a VoIP call to a PSTN call, the on-hook/off-hook state is logic 0. In other embodiments, the logic 0 and 1 are interchangeable.

The OPD state indicates whether the IAD is overcurrent or not. The OPD state is changed when the IAD is overcurrent. The overload detection state indicates whether the IAD is accompanied with an overcurrent detection function or not. If the overload detection state is enabled, the IAD has the overcurrent detection function and the OPD state is enabled, or vice versa.

Commonly, the VoIP phone 10 is on-hooked. The on-hook/off-hook state of the DAA chipset 200 is on-hook. The overload detection state is disabled. The state setting module 206 sets the OPD state as a default state, such as logic 0.

When the VoIP phone 10 wants to communicate with the telephone 40, the VoIP phone 10 is off-hooked and a telephone number may be dialed. The DAA chipset 200 of the IAD 20 converts the telephone number into a PSTN call. The state detection module 208 periodically detects the on-hook/off-hook state of the DAA chipset 200. When the on-hook/off-hook state of the DAA chipset 200 is changed to off-hook, the state setting module 206 enables the overload detection state.

The VoIP phone 10 may periodically be on-hooked due to a wrong telephone number/dial. The state detection module 208 continuously detects the on-hook/off-hook state of the DAA chipset 200 to avoid the VoIP phone 10 on-hooking after the on-hook/off-hook state of the DAA chipset 200 is in off-hook state. If the on-hook/off-hook state of the DAA chipset 200 is on-hooked, the state setting module 206 disables the overload detection state.

The state monitoring module 210 periodically monitors the OPD state of the DAA chipset 200 upon the condition that the on-hook/off-hook state of the DAA chipset is detected in off-hook state at least twice and the overload detection state is enabled to determine if the DAA chipset 200 is overcurrent. If the OPD state is changed, which means the OPD state is not the default state of the OPD, the DAA chipset 200 is overcurrent, or vice versa.

When the OPD state of the DAA chipset 200 indicates the DAA chipset 200 is overcurrent, the state setting module 206 disables the overload detection state and sets the on-hook/off-hook state of the DAA chipset 200 as on-hook to avoid damage to the DAA chipset 200 caused by the overcurrent.

Figure 2:
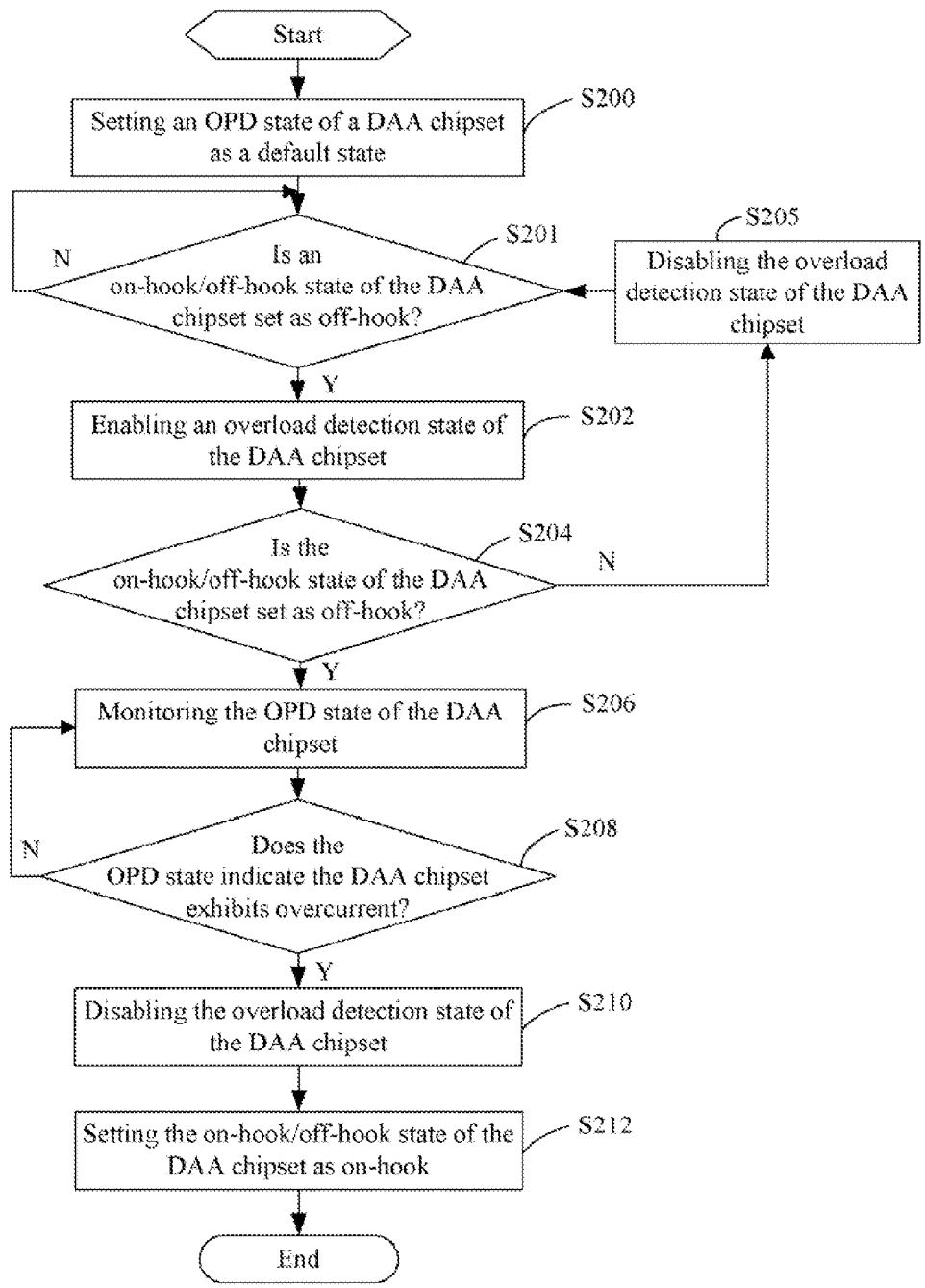
FIG. 2 is a flowchart of one embodiment of an overcurrent protection method.

FIG. 2 is a flowchart of an overcurrent protection method of one embodiment of the present disclosure. The method may be embodied in the IAD 20, and is executed by the functional modules such as those of FIG. 1. Depending on the embodiment, additional blocks are addable, deletable, and the ordering of blocks alterable, without prejudice to the scope of the disclosure.

Commonly, the VoIP phone 10 is on-hooked. The on-hook/off-hook state of the DAA chipset 200 is on-hook. The overload detection state is disabled. In block S200, the state setting module 206 sets the OPD state as a default state, such as logic 0.

When the VoIP phone 10 wants to communicate with the telephone 40, the VoIP phone 10 is off-hooked and dialed with a telephone number by a dialer. The DAA chipset 200 of the IAD 20 converts the telephone number to a PSTN call. In block S201, the state detection module 208 detects the on-hook/off-hook state of the DAA chipset 200. If the on-hook/ off-hook state of the DAA chipset 200 is changed to off-hook, in block S202, the state setting module 206 enables the overload detection state of the DAA chipset 200.

The VoIP phone 10 may periodically be on-hooked due to a wrong telephone number/dial. In block S204, the state detection module 208 detects the on-hook/off-hook state of the DAA chipset 200 again to avoid the VoIP phone 10 on-hooking after the on-hook/off-hook state of the DAA chipset 200 is in off-hook state. If the on-hook/off-hook state of the DAA chipset 200 is on-hook, then in block S205, the state setting module 206 disables the overload detection state of the DAA chipset 200.

If the on-hook/off-hook state of the DAA chipset 200 is still off-hook, in block S206, the state monitoring module 210 monitors the OPD state of the DAA chipset 200 and, in block S208, determines if the DAA chipset 200 is overcurrent. If the OPD state is changed, which means the OPD state is not the default state of the OPD state, the DAA chipset 200 is overcurrent, or vice versa. If the DAA chipset 200 is not overcurrent, in block S206, the state monitoring module 210 periodically monitors the OPD state of the DAA chipset 200.

If the DAA chipset 200 is overcurrent, in block S210, the state setting module 206 disables the overload detection state and, in block S212, sets the on-hook/off-hook state of the DAA chipset 200 as on-hook to avoid damage to the DAA chipset 200 caused by the overcurrent.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. An integrated access device (IAD) comprising a data access arrangement (DAA) chipset, a processor, a storage system, and one or more programs, wherein the one or more programs are stored in the storage system and operable to be executed by the processor, the one or more programs comprising:
    a state detection module operable to periodically detect an on-hook/off-hook state of the DAA chipset;
    a state setting module operable to enable an overload detection state of the DAA chipset if the on-hook/off-hook state of the DAA chipset is detected in an off-hook state; and
    a state monitoring module operable to periodically monitor an overload protect detected (OPD) state of the DAA chipset upon the condition that the on-hook/off-hook state of the DAA chipset is detected in off-hook state at least twice and the overload detection state of the DAA chipset is enabled;
    wherein the state setting module is further operable to disable the overload detection state and set the on-hook/off-hook state of the DAA chipset as on-hook to avoid damage to the DAA chipset caused by overcurrent upon the condition that the OPD state of the DAA chipset indicates the DAA chipset is overcurrent.

2. The IAD as claimed in claim 1, wherein the state setting module is further operable to disable the overload detection state of the DAA chipset upon the condition that the overload detection state of the DAA chipset is enabled and the on-hook/off-hook state of the DAA chipset is detected in on-hook state.

3. The IAD as claimed in claim 1, wherein change of the OPD state of the DAA chipset represents the DAA chipset is overcurrent.

4. An overcurrent protection method for a data access arrangement (DAA) chipset comprising:
    determining if an on-hook/off-hook state of the DAA chipset is changed to off-hook;
    enabling an overload detection state of the DAA chipset if the on-hook/off-hook state of the DAA chipset is changed to off-hook;
    determining if the on-hook/off-hook state of the DAA chipset is still off-hook;
    monitoring an overload protect detected (OPD) state of the DAA chipset if the on-hook/off-hook state of the DAA chipset is still off-hook;
    determining if the OPD state of the DAA chipset indicates that the DAA chipset is overcurrent;
    disabling the overload detection state of the DAA chipset if the DAA chipset is overcurrent; and
    setting the on-hook/off-hook state of the DAA chipset as on-hook to avoid damage to the DAA chipset caused by the overcurrent.

5. The method as claimed in claim 4, further comprising disabling the overload detection state of the DAA chipset if the on-hook/off-hook state of the DAA chipset is on-hook.

6. The method as claimed in claim 4, further comprising periodically monitoring the OPD state of the DAA chipset if the DAA chipset is not overcurrent.

7. The method as claimed in claim 4, wherein change of the OPD state of the DAA chipset represents the DAA chipset is overcurrent.

* * * * *